US011658278B2

(12) United States Patent
Osumi et al.

(10) Patent No.: US 11,658,278 B2
(45) Date of Patent: May 23, 2023

(54) CARBON BLACK FOR BATTERIES, COATING LIQUID FOR BATTERIES, POSITIVE ELECTRODE FOR NONAQUEOUS BATTERIES AND NONAQUEOUS BATTERY

(71) Applicants: Denka Company Limited, Tokyo (JP); CENTRAL GLASS COMPANY, LIMITED, Ube (JP)

(72) Inventors: Shinichiro Osumi, Machida (JP); Tatsuya Nagai, Machida (JP); Takako Arai, Machida (JP); Tetsuya Ito, Machida (JP); Hiroyuki Oomori, Ube (JP); Shoi Suzuki, Ube (JP); Akifumi Yao, Ube (JP)

(73) Assignees: DENKA COMPANY LIMITED, Tokyo (JP); CENTRAL GLASS COMPANY, LIMITED, Ube (JP)

( * ) Notice: Subject to any disclaimer, the term of this patent is extended or adjusted under 35 U.S.C. 154(b) by 374 days.

(21) Appl. No.: 16/822,284

(22) Filed: Mar. 18, 2020

(65) Prior Publication Data
US 2020/0227721 A1 Jul. 16, 2020

Related U.S. Application Data

(63) Continuation of application No. PCT/JP2018/034219, filed on Sep. 14, 2018.

(30) Foreign Application Priority Data

Sep. 19, 2017 (JP) .............................. JP2017-178467

(51) Int. Cl.
C09C 1/56 (2006.01)
H01M 4/04 (2006.01)
H01M 4/1393 (2010.01)
H01M 4/62 (2006.01)
H01M 4/02 (2006.01)

(52) U.S. Cl.
CPC ............. *H01M 4/0416* (2013.01); *C09C 1/56* (2013.01); *H01M 4/1393* (2013.01); *H01M 4/622* (2013.01); *H01M 2004/028* (2013.01)

(58) Field of Classification Search
CPC ........................................................ C09C 1/56
See application file for complete search history.

(56) References Cited

U.S. PATENT DOCUMENTS 3,340,081 A * 9/1967 Teter .................. C09C 1/56
423/449.4
2016/0322640 A1 11/2016 Yamaguchi et al.
2017/0084920 A1 3/2017 Sawai et al.

FOREIGN PATENT DOCUMENTS

| CN | 101106194 A | 1/2008 |
|---|---|---|
| CN | 102874758 A | 1/2013 |
| CN | 106550614 A | 3/2017 |
| EP | 0248386 A2 | 12/1987 |
| EP | 0 621 236 A1 | 10/1994 |
| JP | H6-256008 A | 9/1994 |
| JP | H9-40881 A | 2/1997 |
| JP | 2005-317447 A | 11/2005 |
| JP | 2006-59732 A | 3/2006 |
| JP | 2007-264547 A | 10/2007 |
| JP | 2013-127860 A | 6/2013 |
| JP | 2014-235798 A | 12/2014 |
| JP | 2015-228290 A | 12/2015 |
| JP | 2016-204398 A | 12/2016 |
| JP | 6088418 B2 | 3/2017 |
| JP | 2018-73765 A | 5/2018 |

OTHER PUBLICATIONS

Written Opinion issued for corresponding International Patent Application No. PCT/JP2018/034219 dated Oct. 23, 2018 with English Translation.
Office Action issued for corresponding Korean Patent Application No. 10-2020-7009696 dated Apr. 30, 2021, along with an English machine translation.
Extended European Search Report issued for corresponding European Patent Application No. 18859126.7 dated Oct. 5, 2020.
Sansotera et al., "Preparation and characterization of superhydrophobic conductive fluorinated carbon blacks", Carbon vol. 48, Issue 15, Dec. 2010, pp. 4382-4390, cited in NPL No. 1.
Notice of Allowance dated Nov. 16, 2021 for corresponding Korean Patent Application No. 10-2020-7009696, along with an English machine translation.
International Search Report issued for corresponding International Patent Application No. PCT/JP2018/034219 dated Oct. 23, 2018, along with an English translation.
Written Opinion issued for corresponding International Patent Application No. PCT/JP2018/034219 dated Oct. 23, 2018.
Notice of Allowance dated Aug. 3, 2022, for corresponding Chinese Patent Application No. 201880058447.0, along with an English machine translation.

* cited by examiner

*Primary Examiner* — Stuart L Hendrickson
(74) *Attorney, Agent, or Firm* — Hauptman Ham, LLP

(57) ABSTRACT

To provide a carbon black for batteries capable of readily obtaining a positive electrode for batteries having excellent adhesiveness, and excellent output characteristics and the cycle characteristics. A carbon black for batteries, the carbon black having a BET specific surface area measured according to JIS K6217-2 C method of 100 m²/g or larger, and a surface fluorine concentration X (unit: atom %) and a surface oxygen concentration Y (unit: atom %) measured by X-ray Photoelectron Spectroscopy (XPS) satisfying the following conditions (A) and (B), $0.3 \leq X \leq 4.0$ and  (A)

$0.1 \leq Y \leq 3.0$.  (B)

17 Claims, No Drawings

# CARBON BLACK FOR BATTERIES, COATING LIQUID FOR BATTERIES, POSITIVE ELECTRODE FOR NONAQUEOUS BATTERIES AND NONAQUEOUS BATTERY

CROSS REFERENCE TO RELATED APPLICATIONS

This application is a U.S. continuation application filed below 35 U.S.C. § 111(a), of International Application No. PCT/JP2018/034219, filed on Sep. 14, 2018, which claims priority to Japanese Patent Application No. 2017-178467 filed on Sep. 19, 2017, the disclosures of which are incorporated by reference.

FIELD

The present invention relates to a carbon black for batteries, a coating liquid for batteries, a positive electrode for nonaqueous batteries and a nonaqueous battery.

BACKGROUND

From an increasing attention on environmental and energy problems, technical developments for realizing a low carbon society where dependency on a fossil fuel is reduced have been actively forwarded. Examples of the technical development like this cover a wide range such as a development of low emission vehicles such as hybrid electric automobiles and electric vehicles, a development of natural energy power such as solar power and wind power and energy storage system, and a development of a next generation transmission network that efficiently supplies electric power and reduces the transmission loss.

One of key devices commonly necessary for these technologies is a battery, and, for the battery like this, a high energy density is required to miniaturize a system. Furthermore, high output characteristics that enable to supply stable electric power without being disturbed by a use environmental temperature are demanded. Furthermore, excellent cycle characteristics that can withstand a long term use are also demanded. Therefore, the substitution of conventional lead batteries, nickel-cadmium batteries and nickel-hydrogen batteries with lithium ion secondary batteries having a higher energy density, output characteristics and cycle characteristics is rapidly forwarding.

Recently, a further improvement in the energy density of the lithium ion secondary battery is demanded. For this reason, it is demanded to furthermore reduce a content of a conductive agent that is a component that does not contribute to charge/discharge capacity in an electrode mixture. For example, in consumer batteries such as digital devices, it is said that, in a positive electrode mixture, a content of the conductive agent is typically 2 mass % or lower, furthermore, preferably 1 mass % or lower.

From these situations, it is demanded for the carbon black that is a conductive agent to exhibit sufficient electronic conductivity even when its addition amount is a small amount.

By the way, the carbon black has a structure in which primary particles having a shape close to sphere as a common structure are rosary-likely joined, and the structure like this is called a "structure". In general, the smaller the primary particle diameter is, the more electrical contact points are in the conductive agent of the same mass, and the electronic conductivity is more improved. Furthermore, the structures are joined longer, the contact resistance is smaller and a length capable of electronically conducting is longer. Therefore, the electronic conductivity is improved. A length of the structure is generally indirectly evaluated by using a DBP absorption amount measured according to JIS K6217-4. The larger the DBP absorption amount is, the longer the structure is, and the conductivity is said to be more excellent.

However, the carbon black having a smaller primary particle diameter and a longer structure, while having excellent conductivity, interaction between particles is larger, and has an aspect such that it is difficult to pulverize and easy to flocculate. Accordingly, generally during the manufacturing of the electrode, a coating liquid in which an active material, a conductive agent and a binder are dispersed in water or an organic solvent is coated on a metal foil. However, when the carbon black having smaller primary particle diameter and longer structure is used as the conductive agent, problems that the aggregates of the conductive agent remain in the coating liquid to degrade the binding property of the electrode, furthermore, the output characteristics and the cycle characteristics of the battery degrade tend to occur.

In order to prevent these problems, it is effective to improve the dispersibility of the carbon black. As a method for the improvement, it is cited to functionalize a surface of the carbon black. For example, in Japanese Laid Open Patent Application Publication No. H09-40881, it is disclosed that when the carbon black is oxidized under a mixed gas atmosphere of fluorine and oxygen, functional groups such as ionic fluorine, a hydroxyl group, a carbonyl group, and a carboxyl group are imparted on a surface of the carbon black to be able to improve a dispersion state in pigment application fields or in conductivity application fields of a coating liquid, an ink, and a resin. However, in battery application fields, although there is an effect of improving the dispersion state, all of the binding property of the electrode, and the output characteristics and the cycle characteristics of the batteries could not be satisfied.

SUMMARY

The present invention intends, in view of the above problems, to provide a carbon black for batteries capable of readily obtaining a positive electrodes for batteries having excellent binding properties, and a battery having excellent output characteristics and cycle characteristics.

Namely, the present invention adopts the following means for solving the above problems.

(1) A carbon black for batteries, the carbon black having a BET specific surface area measured according to JIS K6217-2 of 100 m$^2$/g or larger, and a surface fluorine concentration X (unit: atom %) and a surface oxygen concentration Y (unit: atom %) measured by X-ray Photoelectron Spectroscopy (XPS) satisfying the following conditions (A) and (B).

$0.3 \leq X \leq 4.0$ and (A)

$0.1 \leq Y \leq 3.0$. (B)

(2) The carbon black for batteries according to the (1) characterized by having a DBP absorption amount measured according to JIS K6217-4 of 200 ml/100 g or larger.

(3) The carbon black for batteries according to the (1) or (2) characterized by having a spin-spin relaxation time $T_2$ at 34° C. measured by using an evaluation slurry is 1400 m-seconds or shorter, the carbon black being dispersed in the evaluation slurry in a concentration of 3 mass % of the carbon black in N-methyl pyrrolidone.

(4) A manufacturing method of the carbon black for batteries according to the (1) includes:
a step of contacting the carbon black having the BET specific surface area measured according to the JIS K6217-2 of 100 m$^2$/g or larger with a treatment gas containing fluorine of 0.01 vol % or larger and 7 vol % or smaller; and
a step of exposing the carbon black contacted with the treatment gas to atmosphere.
(5) The manufacturing method of the carbon black for batteries according to the (4), in which an amount of oxygen mixed in the treatment gas is 0.1 vol % or smaller.
(6) A coating liquid for batteries characterized by containing an active material capable of absorbing and releasing lithium ions, a polymer binder and the carbon black for batteries according to any one of the (1) to (3).
(7) A positive electrode for nonaqueous batteries characterized by having an active material layer on a metal foil, the active material layer including, the active material capable of absorbing and releasing lithium ions, a polymer binder and the carbon black for batteries according to any one of the (1) to (3).
(8) A nonaqueous battery using the positive electrode for nonaqueous batteries according to the (7).

The present inventors found by intensive researches that a positive electrode for batteries produced with a carbon black having a BET specific surface area, a surface fluorine concentration and a surface oxygen concentration in the specific ranges has excellent binding property, and a battery that uses the positive electrode for batteries has excellent output characteristics and the cycle characteristics.

DESCRIPTION OF EMBODIMENTS

The present invention will be described in more detail as following. The carbon black for batteries of the present invention is a carbon black for batteries characterized in that a BET specific surface area measured according to JIS K6217-2 is 100 m$^2$/g or larger, and a surface fluorine concentration X (unit: atom %) and a surface oxygen concentration Y (unit: atom %) which were measured by X-ray Photoelectron Spectroscopy (XPS) satisfy the following conditions (A) and (B).

$$0.3 \leq X \leq 4.0 \text{ and} \quad (A)$$

$$0.1 \leq Y \leq 3.0. \quad (B)$$

The carbon black for batteries in the present invention is selected among an acetylene black, a furnace black, and a channel black the same as the carbon black as a general conductive agent for batteries. Among these, the acetylene black having excellent crystalline nature and purity is more preferable.

The BET specific surface area of the carbon black for batteries in the present invention is 100 m$^2$/g or larger, more preferably 100 m$^2$/g or larger and 300 m$^2$/g or smaller. When the BET specific surface area is 100 m$^2$/g or larger, the active material is in contact with the metal foil at many points to be able to obtain excellent electronic conductivity. Furthermore, when the BET specific surface area is 300 m$^2$/g or smaller, the interaction between the particles is suppressed to be excellent in the dispersibility.

The surface fluorine concentration X (unit: atom %) and the surface oxygen concentration Y (unit: atom %) of the carbon black for batteries in the present invention measured by the XPS are $0.3 \leq X \leq 4.0$ and $0.1 \leq Y \leq 3.0$, and preferably $1.0 \leq X \leq 4.0$ and $1.0 \leq Y \leq 3.0$. When X and Y are $X \geq 0.3$ and $Y \geq 0.2$, the hydrophilicity to a dispersion medium is improved, and the excellent dispersibility is obtained. Furthermore, when X and Y are $X \leq 4.0$ and $Y \leq 3.0$, the inhibition of the electron transfer is suppressed, and excellent conductivity is obtained.

The DPB absorption amount of the carbon black for batteries in the present invention is preferably 200 ml/100 g or larger, and more preferably 200 ml/100 g or larger and 400 ml/100 g or smaller. When the DPB absorption amount is 200 ml/100 g or larger, a structure when used as a conductive agent has a sufficient length to be able to obtain excellent conductivity. Furthermore, when the DPB absorption amount is 400 ml/100 g or smaller, the coagulation due to the entanglement between the structures is suppressed to be excellent in the dispersibility.

A spin-spin relaxation time $T_2$ at 34° C. measured by using an evaluation slurry is 1400 m-seconds or shorter, the carbon black for batteries in the present invention being dispersed in the evaluation slurry in a concentration of 3 mass % in N-methyl pyrrolidone is preferably 1400 m-seconds or shorter. The $T_2$ is a value that reflects a molecular motion of a hydrogen nucleus of a solvent present in the evaluation slurry and the $T_2$ becomes shorter as an area where the carbon black contacts with a solvent increases by miniaturizing the carbon black. When the $T_2$ is 1400 m-seconds or shorter, the dispersibility of the carbon black is excellent.

According to a manufacturing method of the carbon black for batteries in the present invention, the carbon black is charged in a vessel, and a treatment gas containing a fluorine gas at a predetermined concentration is flowed to fluorinate. A concentration of the fluorine gas in the treatment gas is 0.01 vol % or larger and 7 vol % or smaller. Furthermore, the treatment gas is preferable to be a gas obtained by diluting the fluorine gas to a predetermined concentration with an inert gas such as a nitrogen gas, an argon gas or a neon gas. Still furthermore, it is preferable that oxygen is not mixed in the treatment gas, if it is mixed, an amount of oxygen is preferably smaller than 1 vol %, and more preferably smaller than 0.1 vol %.

As long as a container material is a metal material, a safe treatment may be performed, however, when a continuous treatment is performed, a stainless material such as SUS304 or SUS316 or nickel is preferable from the viewpoint of corrosion resistance. Since when a treatment temperature is a high temperature of 50° C. or higher, there is a risk of explosion due to proceeding of the fluorination more than expected, and, when the treatment temperature is a low temperature lower than 10° C., since a device or energy for cooling to generate a cooling state is necessary and cost problem is caused, the treatment at around room temperature is desirable. Furthermore, when heat is generated by contacting of the carbon black and the fluorine, in order to control the reaction, cooling water may be used to cool a device. Although a processing pressure may be appropriately controlled according to a concentration of fluorine and a processing temperature, and a processing time, in order to prevent leakage of the fluorine gas, the processing pressure is preferably set to 1 atmospheric pressure or lower, and more preferably to 50 Torr or larger and 500 Torr or lower. Regarding the processing time, it is necessary a sufficient time in order to contact sufficiently of the carbon black and fluorine, it is desirable to ensure 10 minutes or longer, and furthermore desirable to ensure 30 minutes or longer. If it is too long, since there is no influence on the performance as the conductive agent but the productivity degrades, it is desirable to be within two hours.

By the way, in the fluorination process, it is frequent that the fluorine gas is physically absorbed by pores of the carbon black. Therefore, it is preferable to remove the physically absorbed fluorine gas by placing the fluorinated carbon black under a deaerating atmosphere.

Furthermore, after the fluorination treatment, the carbon black is contacted with gaseous water to react a fluorine component and water to modify a surface. At that time, although liquid water may be used, because handling of the carbon black will be difficult, using a gaseous water is desirable. In that case, it is preferable to make the carbon black contact with a gas having a moisture concentration of 0.001 vol % or larger and 100 vol % or smaller, and preferable to make contact with wet atmosphere having the relative humidity of 10% or larger, preferably 30% or larger. When the carbon black is exposed to the atmosphere of the normal temperature and normal humidity (for example, the temperature is 5° C. or higher and 35° C. or lower, relative humidity is 30% or higher and 80% or lower), a treatment of 2 hours or longer and within 48 hours may be applied, when the carbon black contacts with the atmosphere saturated with steam of normal temperature and relative humidity of 100%, the treatment of 10 minutes or longer and within two hours may be performed.

On a surface of the carbon black, C—F groups are generated by the fluorination treatment. By the action of $H_2O$, the C—F groups on the surface of the carbon black are converted to C—OF groups, C—OH groups or COOH groups to modify the surface. However, a part of the C—F groups has a strong bond between F and C due to the difference of the crystallinity of the carbon black and remains without reacting with $H_2O$.

When preparing the positive electrode with the carbon black for batteries of the present invention, the carbon black for batteries is dispersed in a medium together with an active material capable of absorbing and releasing lithium ions and a polymer binder and may be used as a coating liquid for batteries. By forming a film by coating the coating liquid for batteries on a metal foil, a positive electrode having an active material layer containing the carbon black, the active material and the polymer binder on the metal foil may be obtained. Examples of the active materials include: composite oxides having a layered rock salt type structure such as lithium cobaltate, lithium nickelate, lithium nickel cobalt manganate, and lithium nickel cobalt aluminate; composite oxides having a spinel type structure such as lithium manganate and lithium nickel manganate; and composite oxides having an olivine type structure such as lithium iron phosphate, lithium manganese phosphate, and lithium iron manganese phosphate. A polymer binder integrates the carbon black and the active material to fix on the metal foil. Examples of the polymer binders may include a polymer such as polyvinylidene fluoride, polytetrafluoroethylene, a styrene-butadiene copolymer, polyvinyl alcohol, an acrylonitrile-butadiene copolymer, and a carboxylate-modified (meth)acrylic acid ester copolymer. Among these, the polyvinylidene fluoride is preferable from the viewpoint of the oxidation resistance.

Examples of the dispersion medium of a coating liquid for batteries include water, N-methyl pyrrolidone, cyclohexane, methyl ethyl ketone, and methyl isobutyl ketone. When polyfluorinated vinylidene is used as a polymer binder, from the viewpoint of the solubility, N-methyl pyrrolidone is preferable, and when a styrene-butadiene copolymer is used, water is preferable.

As a mixer for producing the coating liquid for batteries of the present invention, a mixer such as a grinding machine, a universal mixer, a Henschel mixer or a ribbon blender or a medium stirring type mixer such as a beads mill, a vibration mill or a ball mill may be used. Furthermore, the produced coating liquid for batteries is preferably vacuum-degassed in the step of before coating to secure the smoothness by preventing generation of defects in the film. When bubbles are present in the coating liquid, when it is coated on the metal foil, defects are generated in the film to degrade the smoothness.

Furthermore, the coating liquid for batteries of the present invention may contain components other than the carbon black, the positive electrode active material, and the polymer binder so that the effects of the present invention are not deteriorated. For example, in order to furthermore improve the conductivity, other than the carbon black, carbon nanotubes, carbon nanofibers, graphite, graphene, graphene oxide, carbon fibers, elemental carbon, glassy carbon, and metallic particles may be contained. Furthermore, in order to improve the dispersibility, polyvinyl pyrrolidone, polyvinyl imidazole, polyethylene glycol, polyvinyl alcohol, polyvinyl butyral, carboxy methyl cellulose, acetyl cellulose or carboxylic acid modified (meth)acrylic acid ester copolymer may be contained.

EXAMPLES

As follows, the carbon black for batteries of the present invention will be detailed with reference to Examples and Comparative Examples. However, the present invention is not limited to the following examples as long as it does not exceed its gist.

Example 1

(Carbon Black for Batteries)

An acetylene black (manufactured by Denka Co., Ltd.) having a BET specific surface area of 139 $m^2$/g, a surface fluorine concentration of 0.0 atom %, a surface oxygen concentration of 0.2 atom %, and a DBP absorption amount of 291 ml/100 g was encapsulated in a 5L stainless vessel and an inside of the vessel was evacuated. Fluorine diluted to vol % with nitrogen was encapsulated in the vessel at the pressure of 200 Torr, after that the fluorine was flowed with a total flow amount of 0.5 SLM (abbreviation of Standard Litre per Minute. A litter/minute based on 0° C. and 1 atmospheric pressure.) for 30 minutes. By the way, the reaction was performed at room temperature (25° C.). After the end of the flowing, the inside of the vessel was sufficiently substituted with nitrogen. Thereafter, the inside of the vessel was depressurized again to a vacuum state and deaerated for overnight, accordingly the fluorine absorbed by the carbon black was removed as much as possible. Subsequently, the inside of the vessel was returned to the atmospheric pressure followed by opening, and the carbon black was taken out. The taken-out carbon black was exposed to the atmosphere for one day and night (for 24 hours) under the environment of a temperature of 25° C. and the relative humidity of 70%, accordingly the carbon black having the BET specific surface area of 142 $m^2$/g, the surface fluorine concentration of 2.6 atom %, the surface oxygen concentration of 1.3 atom %, the DBP absorption amount of 226 ml/100 g, and a spin-spin relaxation time at 34° C. measured by using the evaluation slurry is 1277 m-seconds, the carbon black being dispersed in the evaluation slurry in a concentration of 3 mass % in N-methyl pyrrolidone. By the way, the BET specific surface area, the surface fluorine concentration, the surface oxygen concentration, the DBP absorption amount, and the spin-spin relaxation time at 34° C. of the evaluation slurry were measured according to the following methods, the carbon black being dispersed in the evaluation slurry in a concentration of 3 mass % in N-methyl pyrrolidone.

[BET Specific Surface Area]

The BET specific surface area of the carbon black for batteries was measured using a nitrogen absorption specific surface area meter (Macsorb 1201 manufactured by Mountech Co., Ltd.) with nitrogen as the absorbent gas under the condition of relative pressure $p/p^0=0.30\pm0.04$.

[Surface Fluorine Concentration and Surface Oxygen Concentration]

The surface fluorine concentration and the surface oxygen concentration of the carbon black for batteries were obtained by X-ray photoelectron spectroscopy (XPS). A sample (the carbon black for batteries) was charged in a sample holder for powder measurement manufactured by Thermo Fisher Scientific such that a sample surface becomes flat, followed by measuring by K-Alpha type manufactured by Thermo Fisher Scientific. The measurement was performed under the condition of an Al-Kα ray with a monochromator as an x-ray source, coaxial irradiation type dual beams of low speed electrons and low speed $Ar^+$ ions for charge neutralization, 90° of a detection angle, output power: 36 W, a measurement region of about 400 μm×200 μm, a pass energy of 50 eV, data sampling of 0.1 eV/step and 50 m-sec, a cumulative number of 5 times, a measurement range of a CIs spectrum: 279 eV or larger and 298 eV or smaller for carbon, an O1s spectrum: 525 eV or larger and 545 eV or smaller for oxygen, and a F1s spectrum of 678 eV or larger and 698 eV or smaller for fluorine. A binding energy correction of the obtained spectrum was performed with a C—C bond (284.8 eV) in the CIs spectrum. Regarding the spectrum corrected by the binding energy correction, a background (BG) was subtracted by using a Shirlley method in the range of the carbon CIs spectrum: 281 eV or larger and 296 eV or smaller, oxygen O1s spectrum: 528 eV or larger and 538 eV or smaller, and fluorine F1s spectrum: 684 eV or larger and 691 eV or smaller. A peak area (signal intensity) of each element calculated by subtracting the BG from the obtained peak in the above measurement range is divided by a correction factor (a relative sensitivity factor, a transmission function, kinetic energy correction), followed by calculating such that a total of the corrected areas becomes 100, thus the surface fluorine concentration and the surface oxygen concentration were calculated. By the way, the correction factors (a relative sensitivity factor, a transmission function, kinetic energy correction) generally depend on the measurement target element and a measurement device. This time, the above operations and calculations were performed by an analysis soft Thermo Avantage belonged to the K-Alpha type manufactured by Thermo Fisher Scientific.

[DBP Absorption Amount]

The DBP absorption amount of the carbon black for batteries was measured according to a method according to JIS K6217-4.

[Spin-Spin Relaxation Time of Evaluation Slurry]

The spin-spin relaxation time at 34° C. measured by using the evaluation slurry was measured according to the following method, the carbon black for batteries being dispersed in the evaluation slurry in a concentration of 3 mass % in N-methyl pyrrolidone. First, 3 mass % of the carbon black was added to N-methyl pyrrolidone (dewatered, manufactured by KANTO CHEMICAL CO., INC.), followed by mixing with a rotation and revolution mixer (Awatori Rentaro ARV-310, manufactured by Thinky Corporation). The mixture was dispersed by a ultrasonic cleaner (20 W, 5 minutes), followed by rapidly sampling about 500 μL as an evaluation slurry in a NMR tube (5 mmϕ) such that air bubbles are not mingled. Next, the NMR tube containing the evaluation slurry was, after shaking and before the dispersed carbon black precipitate, set to a pulse NMR particle interface characteristic evaluator (Acorn area manufactured by Xigo nanotools), with the evaluation device, with a hydrogen nucleus as a measurement nucleus, under the condition of a measurement frequency of 13 MHz, a 90° pulse width of 6.75 μs, and the temperature of 34° C., by a Carr-Purcell-Meiboom-Gill Method, a temporal change of the intensity of the magnetic moment of the evaluation slurry was measured, and a free induction decay (FID) curve was obtained. The obtained FID curve was fit to an exponential function type by a least square method and $T_2$ was calculated. The analysis was performed using Area Quant manufactured by Xigo nanotools.

(Positive Electrode for Batteries) 0.5 mass parts of the carbon black for batteries, 98.5 mass parts of lithium cobaltate (manufactured by Umicore AG & Co.) as an active material, 1 mass part in a solute amount of a polyvinylidene fluoride solution ("KF polymer 7208" manufactured by Kureha Chemical Corporation) as a polymer binder, and N-methyl pyrrolidone (manufactured by Kishida Chemical Co., Ltd.) as a dispersion medium were added, followed by mixing with a rotation and revolution mixer (Awatori Rentaro ARV-310, manufactured by Thinky Corporation), and a coating liquid was obtained. This coating liquid was coated on an aluminum foil having a thickness of 20 μm by using a Baker type applicator, dried, thereafter, pressed, cut, accordingly a positive electrode for lithium ion secondary batteries was obtained.

[Binding Property (Peel Adhesion Strength)]

The positive electrode for the lithium ion secondary batteries was cut into a width of 1.5 cm, an adhesive tape (Line Tape E-SD manufactured by Nitto Denko Corporation) was adhered on a positive electrode active material surface, followed by furthermore adhering a stainless sheet and a tape adhered to a positive electrode sheet with a double-sided tape (NICETACK NWBB-15 manufactured by Nichiban Co., Ltd.). Furthermore, an adhesive tape was adhered to an aluminum foil to form a test piece. A stress when the adhesive tape to which the aluminum foil was adhered was peeled at a speed of 50 mm/min in the direction of 180°, in an atmosphere of 23° C. and the relative humidity of 50%, was measured. This measurement was repeated 5 times and an average value thereof was obtained, and it was taken as the peel adhesion strength. The peel adhesion strength of the present embodiment was 22 N/m.

(Negative Electrode for Batteries)

98 mass parts of graphite powder (MAG-D, manufactured by Hitachi Chemical Co., Ltd.) as an active material, 2 mass parts in a solute amount of a polyvinylidene fluoride solution as a polymer binder, and N-methyl pyrrolidone as a dispersion medium were added, followed by mixing with a rotation and revolution mixer, and a coating liquid was obtained. This coating liquid was coated on a copper foil having a thickness of 15 μm by using a Baker type applicator, dried, thereafter, pressed, cut, accordingly a negative electrode for lithium ion secondary batteries was obtained.

(Lithium Ion Secondary Battery)

A laminate type battery was formed with a member obtained by cutting the positive electrode for the lithium ion secondary batteries into 40 mm long and 40 mm wide as a positive electrode, a member obtained by cutting the negative electrode for the lithium ion secondary batteries into 44 mm long and 44 mm wide as a negative electrode, an olefin fiber nonwoven fabric as a separator for electrically isolating these, and an aluminum laminate film as an exterior. An electrolytic solution is formed by dissolving 1 mol/L of lithium hexafluorophosphate (LiPF$_6$, manufactured by Stella-Chemifa Co.,) in a solution obtained by mixing ethylene carbonate (EC manufactured by Aldrich Corporation) and diethyl carbonate (DEC manufactured by Aldrich Corporation) at a volume ratio of 1:2. The prepared lithium ion secondary battery was evaluated of the battery performance according to the following method. By the way, unless otherwise noted, an evaluation value is an arithmetic average value of evaluation values of 3 batteries.

[Output Characteristics (Capacity Retention Rate at 3C Discharge)]

The prepared lithium ion battery was charged by a constant current and constant voltage charging method under a limitation of 4.2 V, 0.2 C at 25° C., subsequently the lithium ion battery was discharged at a constant current of 0.2 C up to 3.0 V. Then, by changing the discharge current to 0.2C, 3C, a discharge capacity to each of the discharge currents was measured. As a recovery charge at each measurement, a constant current and constant voltage charging method under a limitation of 4.2 V and 0.2C was performed. Then, a capacity retention rate at 3C discharge to 0.2C discharge of the second time was calculated. The capacity retention rate at the time of 3C discharge of the present example was 79%.

[Cycle Characteristics (Cycle Capacity Retention Rate)]

The prepared lithium ion battery was charged by a constant current and a constant voltage charging method under a limitation of 4.2V and 1C at 25° C., subsequently the lithium ion battery was discharged at a constant current of 1C up to 3.0 V. The cycle of charge and discharge was repeated and a ratio of the discharge capacity at the 500$^{th}$ cycle to the discharge capacity at the 1$^{st}$ cycle was obtained as the cycle capacity retention rate. The cycle capacity retention rate of the present example was 84%.

Example 2

A carbon black of Example 2 is obtained by flowing fluorine diluted to 7 vol % with nitrogen at 200 Torr to an acetylene black (manufactured by Denka Co., Ltd.) having the BET specific surface area of 367 m$^2$/g, the surface fluorine concentration of 0.0 atom %, the surface oxygen concentration of 0.4 atom %, and the DBP absorption amount of 350 ml/100 g. The treatments of Example 2 other than the above are the same as Example 1. The carbon black of the Example 2 has the BET specific surface area of 370 m$^2$/g, the surface fluorine concentration of 3.0 atom % and the surface oxygen concentration of 2.1 atom %, which were measured by XPS, the DBP absorption amount of 305 ml/100 g, and the spin-spin relaxation time at 34° C. measured by using the evaluation slurry is 650 m-seconds, the carbon black being dispersed in the evaluation slurry in a concentration of 3 mass % in N-methyl pyrrolidone. Other than the above points, by the same method as that of Example 1, the coating liquid for batteries, the positive electrode for batteries, and batteries were prepared, followed by performing each of evaluations. Results are shown in Table 1.

Example 3

A carbon black of Example 3 is obtained by flowing fluorine diluted to 0.5 vol % with nitrogen at 200 Torr to an acetylene black (manufactured by Denka Co., Ltd.) having the BET specific surface area of 139 m$^2$/g, the surface fluorine concentration of 0.0 atom %, the surface oxygen concentration of 0.2 atom %, and the DBP absorption amount of 291 ml/100 g. The treatments of Example 3 other than the above are the same as Example 1. The carbon black of the Example 3 had the BET specific surface area of 139 m$^2$/g, the surface fluorine concentration of 0.8 atom % and the surface oxygen concentration of 0.7 atom %, which were measured by XPS, the DBP absorption amount of 245 ml/100 g, and the spin-spin relaxation time at 34° C. measured by using the evaluation slurry is 1290 m-seconds, the carbon black being dispersed in the evaluation slurry in a concentration of 3 mass % in N-methyl pyrrolidone. Other than the above points, by the same method as that of Example 1, the coating liquid for batteries, the positive electrode for batteries, and batteries were prepared, followed by performing each of evaluations. Results are shown in Table 1.

Example 4

A carbon black of Example 4 is obtained by flowing fluorine diluted to 3 vol % with nitrogen at 200 Torr to an acetylene black (manufactured by Denka Co., Ltd.) having the BET specific surface area of 796 m$^2$/g, the surface fluorine concentration of 0.0 atom % and the surface oxygen concentration of 0.4 atom %, and the DBP absorption amount of 490 ml/100 g. The treatments of Example 4 other than the above are the same as Example 1. The carbon black of the Example 4 had the BET specific surface area of 800 m$^2$/g, the surface fluorine concentration of 2.2 atom % and the surface oxygen concentration of 1.1 atom %, which were measured by XPS, the DBP absorption amount of 430 ml/100 g, and the spin-spin relaxation time at 34° C. measured by using the evaluation slurry is 450 m-seconds, the carbon black being dispersed in the evaluation slurry in a concentration of 3 mass % in N-methyl pyrrolidone. Other than the above points, by the same method as that of Example 1, the coating liquid for batteries, the positive electrode for batteries, and batteries were prepared, followed by performing each of evaluations. Results are shown in Table 1.

Example 5

A carbon black of Example 5 is obtained by flowing fluorine diluted to 0.1 vol % with nitrogen at 200 Torr to an acetylene black (manufactured by Denka Co., Ltd.) having the BET specific surface area of 110 m$^2$/g, the surface fluorine concentration of 0.0 atom %, the surface oxygen concentration of 0.2 atom %, and the DBP absorption amount of 250 ml/100 g. The treatments of Example 5 other than the above are the same as Example 1. The carbon black of the Example 5 had the BET specific surface area of 110 m$^2$/g, the surface fluorine concentration of 0.4 atom % and the surface oxygen concentration of 0.3 atom %, which were measured by XPS, the DBP absorption amount of 215 ml/100 g, and the spin-spin relaxation time at 34° C. measured by using the evaluation slurry is 1450 m-seconds, the carbon black being dispersed in the evaluation slurry in a concentration of 3 mass % in N-methyl pyrrolidone. Other than the above points, by the same method as that of Example 1, the coating liquid for batteries, the positive electrode for batteries, and batteries were prepared, followed by performing each of evaluations. Results are shown in Table 1.

Example 6

A carbon black of Example 6 is obtained by flowing fluorine diluted to 5 vol % with nitrogen at 200 Torr to an acetylene black (manufactured by Denka Co., Ltd.) having the BET specific surface area of 161 m$^2$/g, the surface fluorine concentration of 0.0 atom %, the surface oxygen concentration of 0.3 atom %, and the DBP absorption amount of 193 ml/100 g. The treatments of Example 6 other than the above are the same as Example 1. The carbon black of the Example 6 had the BET specific surface area of 163 m$^2$/g, the surface fluorine concentration of 2.6 atom % and the surface oxygen concentration of 1.3 atom %, which were measured by XPS, the DBP absorption amount of 165 ml/100 g, and the spin-spin relaxation time at 34° C. measured by using the evaluation slurry is 1100 m-seconds, the carbon black being dispersed in the evaluation slurry in a concentration of 3 mass % in N-methyl pyrrolidone. Other than the above points, by the same method as that of Example 1, the coating liquid for batteries, the positive electrode for batteries, and batteries were prepared, followed by performing each of evaluations. Results are shown in Table 1.

Example 7

A carbon black of Example 7 is obtained by flowing fluorine diluted to 5 vol % with nitrogen at 200 Torr in a state heated to 40° C. to an acetylene black (manufactured by Denka Co., Ltd.) having the BET specific surface area of 139 m$^2$/g, the surface fluorine concentration of 0.0 atom %, the surface oxygen concentration of 0.2 atom %, and the DBP absorption amount of 291 ml/100 g. The treatments of Example 7 other than the above are the same as Example 1. The carbon black of the Example 7 had the BET specific surface area of 142 m$^2$/g, the surface fluorine concentration of 2.9 atom % and the surface oxygen concentration of 1.5 atom %, which were measured by XPS, the DBP absorption amount of 215 ml/100 g, and the spin-spin relaxation time at 34° C. measured by using the evaluation slurry is 1240 m-seconds, the carbon black being dispersed in the evaluation slurry in a concentration of 3 mass % in N-methyl pyrrolidone. Other than the above points, by the same method as that of Example 1, the coating liquid for batteries, the positive electrode for batteries, and batteries were prepared, followed by performing each of evaluations. Results are shown in Table 1.

Comparative Example 1

A carbon black of Comparative Example 1 is obtained by flowing fluorine diluted to 5 vol % with nitrogen at 200 Torr to an acetylene black (manufactured by Denka Co., Ltd.) having the BET specific surface area of 80 m$^2$/g, the surface fluorine concentration of 0.0 atom %, the surface oxygen concentration of 0.3 atom %, and the DBP absorption amount of 220 ml/100 g. The treatments of Comparative Example 1 other than the above are the same as Example 1. The carbon black of the Comparative Example 1 had the BET specific surface area of 81 m$^2$/g, the surface fluorine concentration of 2.5 atom % and the surface oxygen concentration of 1.2 atom %, which were measured by XPS, the DBP absorption amount of 200 ml/100 g, and the spin-spin relaxation time at 34° C. measured by using the evaluation slurry is 1500 m-seconds, the carbon black being dispersed in the evaluation slurry in a concentration of 3 mass % in N-methyl pyrrolidone. Other than the above points, by the same method as that of Example 1, the coating liquid for batteries, the positive electrode for batteries, and batteries were prepared, followed by performing each of evaluations. Results are shown in Table 1. A battery prepared with the carbon black used in the present Comparative Example had lower output characteristics and cycle characteristics compared with Example 1 where the carbon black having the BET specific surface area of 139 m$^2$/g was processed.

Comparative Example 2

A carbon black of Comparative Example 2 is obtained by using an acetylene black (manufactured by Denka Co., Ltd.) having the BET specific surface area of 139 m$^2$/g, the surface fluorine concentration of 0.0 atom %, the surface oxygen concentration of 0.2 atom %, and the DBP absorption amount of 291 ml/100 g. Other than the above points, by the same method as that of Example 1, the coating liquid for batteries, the positive electrode for batteries, and batteries were prepared, followed by performing each of evaluations. Results are shown in Table 1. A positive electrode for batteries prepared with the carbon black used in the present Comparative Example had low adhesiveness, and resulted in batteries having low rate characteristics and cycle characteristics.

Comparative Example 3

A carbon black of Comparative Example 3 is obtained by flowing fluorine diluted to 8 vol % with nitrogen at 200 Torr to an acetylene black (manufactured by Denka Co., Ltd.) having the BET specific surface area of 139 m$^2$/g, the surface fluorine concentration of 0.0 atom %, the surface oxygen concentration of 0.2 atom %, and the DBP absorption amount of 291 ml/100 g. The treatments of Comparative Example 3 other than the above are the same as Example 1. The carbon black of the Comparative Example 3 had the BET specific surface area of 142 m$^2$/g, the surface fluorine concentration of 4.5 atom % and the surface oxygen concentration of 2.5 atom %, which were measured by XPS, the DBP absorption amount of 215 ml/100 g, and the spin-spin relaxation time at 34° C. measured by using the evaluation slurry is 1250 m-seconds, the carbon black being dispersed in the evaluation slurry in a concentration of 3 mass % in N-methyl pyrrolidone. Other than the above points, by the same method as that of Example 1, the coating liquid for batteries, the positive electrode for batteries, and batteries were prepared, followed by performing each of evaluations. Results are shown in Table 1. A battery prepared with the carbon black used in the present Comparative Example resulted in low output characteristics and cycle characteristics.

Comparative Example 4

A carbon black of Comparative Example 4 is obtained by flowing fluorine diluted to 7.5 vol % with nitrogen at 200 Torr to an acetylene black (manufactured by Denka Co., Ltd.) having the BET specific surface area of 139 m$^2$/g, the surface fluorine concentration of 0.0 atom %, the surface oxygen concentration of 0.2 atom %, and the DBP absorption amount of 291 ml/100 g. The treatments of Comparative Example 4 other than the above are the same as Example 1. The carbon black of the Comparative Example 4 had the BET specific surface area of 142 m$^2$/g, the surface fluorine concentration of 3.5 atom % and the surface oxygen concentration of 3.5 atom %, which were measured by XPS, the DBP absorption amount of 215 ml/100 g, and the spin-spin relaxation time at 34° C. measured by using the evaluation slurry is 1250 m-seconds, the carbon black being dispersed in the evaluation slurry in a concentration of 3 mass % in N-methyl pyrrolidone. Other than the above points, by the same method as that of Example 1, the coating liquid for batteries, the positive electrode for batteries, and batteries were prepared, followed by performing each of evaluations. Results are shown in Table 1. A battery prepared with the carbon black used in the present Comparative Example resulted in low output characteristics and cycle characteristics.

Comparative Example 5

A carbon black of Comparative Example 5 is obtained by flowing fluorine diluted to 10 vol % with nitrogen at 200 Torr to an acetylene black (manufactured by Denka Co., Ltd.) having the BET specific surface area of 110 m$^2$/g, the surface fluorine concentration of 0.0 atom %, the surface oxygen concentration of 0.2 atom %, and the DBP absorption amount of 250 ml/100 g. The treatments of Comparative Example 5 other than the above are the same as Example 1. The carbon black of the Comparative Example 5 had the BET specific surface area of 112 m$^2$/g, the surface fluorine concentration of 5.5 atom % and the surface oxygen concentration of 4.3 atom %, which were measured by XPS, the DBP absorption amount of 200 ml/100 g, and the spin-spin relaxation time at 34° C. measured by using the evaluation slurry is 1400 m-seconds, the carbon black being dispersed in the evaluation slurry in a concentration of 3 mass % in N-methyl pyrrolidone. Other than the above points, by the same method as that of Example 1, the coating liquid for batteries, the positive electrode for batteries, and batteries were prepared, followed by performing each of evaluations. Results are shown in Table 1. A battery prepared with the carbon black used in the present Comparative Example resulted in low output characteristics and cycle characteristics.

Comparative Example 6

A carbon black of Comparative Example 6 is obtained by flowing fluorine diluted to 5 vol % with atmosphere, that is, a mixed gas having a composition made of 5 vol % of fluorine, 20% of oxygen and 75% of nitrogen at 200 Torr to an acetylene black (manufactured by Denka Co., Ltd.) having the BET specific surface area of 139 m$^2$/g, the surface fluorine concentration of 0.0 atom %, the surface oxygen concentration of 0.2 atom %, and the DBP absorption amount of 291 ml/100 g. The treatments of Comparative Example 6 other than the above are the same as Example 1. The carbon black of the Comparative Example 6 had the BET specific surface area of 140 m$^2$/g, the surface fluorine concentration of 4.1 atom % and the surface oxygen concentration of 3.1 atom %, which were measured by XPS, the DBP absorption amount of 205 ml/100 g, and the spin-spin relaxation time at 34° C. measured by using the evaluation slurry is 1300 m-seconds, the carbon black being dispersed in the evaluation slurry in a concentration of 3 mass % in N-methyl pyrrolidone. Other than the above points, by the same method as that of Example 1, the coating liquid for batteries, the positive electrode for batteries, and batteries were prepared, followed by performing each of evaluations. Results are shown in Table 1. A positive electrode for batteries prepared with the carbon black used in the present Comparative Example has low adhesiveness, and the battery resulted in low output characteristics and cycle characteristics.

Comparative Example 7

A carbon black of Comparative Example 7 is obtained by flowing fluorine diluted to 5 vol % with nitrogen at 200 Torr to an acetylene black (manufactured by Denka Co., Ltd.) having the BET specific surface area of 139 m$^2$/g, the surface fluorine concentration of 0.0 atom %, the surface oxygen concentration of 0.2 atom %, and the DBP absorption amount of 291 ml/100 g, followed by handling in a glove bag encapsulated with nitrogen to avoid contact with atmospere. The treatments of Comparative Example 7 other than the above are the same as Example 1. The carbon black of the Comparative Example 7 had the BET specific surface area of 142 m$^2$/g, the surface fluorine concentration of 4.5 atom % and the surface oxygen concentration of 0.3 atom %, which were measured by XPS, the DBP absorption amount of 180 ml/100 g, and the spin-spin relaxation time at 34° C. measured by using the evaluation slurry is 1200 m-seconds, the carbon black being dispersed in the evaluation slurry in a concentration of 3 mass % in N-methyl pyrrolidone. Other than the above points, by the same method as that of Example 1, the coating liquid for batteries, the positive electrode for batteries, and batteries were prepared, followed by performing each of evaluations. Results are shown in Table 1. A positive electrode for batteries prepared with the carbon black used in the present Comparative Example has low adhesiveness, and the battery resulted in low output characteristics and cycle characteristics.

Comparative Example 8

A carbon black of Comparative Example 8 is obtained by flowing fluorine diluted to 5 vol % with nitrogen at 200 Torr to an acetylene black (manufactured by Denka Co., Ltd.) having the BET specific surface area of 139 m$^2$/g, the surface fluorine concentration of 0.0 atom %, the surface oxygen concentration of 0.2 atom %, and the DBP absorption amount of 291 ml/100 g, followed by handling in a glove bag encapsulated with dry air (relative humidity: smaller than 1%) to avoid contact with moisture contained in air. The treatments of Comparative Example 8 other than the above are the same as Example 1. The carbon black of the Comparative Example 8 had the BET specific surface area of 142 m$^2$/g, the surface fluorine concentration of 4.3 atom % and the surface oxygen concentration of 0.6 atom %, which were measured by XPS, the DBP absorption amount of 185 ml/100 g, and the spin-spin relaxation time at 34° C. measured by using the evaluation slurry is 1250 m-seconds, the carbon black being dispersed in the evaluation slurry in a concentration of 3 mass % in N-methyl pyrrolidone. Other than the above points, by the same method as that of Example 1, the coating liquid for batteries, the positive electrode for batteries, and batteries were prepared, followed by performing each of evaluations. Results are shown in Table 1. A positive electrode for batteries prepared with the carbon black used in the present Comparative Example had low adhesiveness, and the battery resulted in low output characteristics and cycle characteristics.

TABLE 1

|  | Example 1 | Example 2 | Example 3 | Example 4 | Example 5 | Example 6 | Example 7 |
|---|---|---|---|---|---|---|---|
| Peel adhesion strength (N/m) | 22 | 20 | 21 | 19 | 16 | 20 | 22 |
| Capacity retention rate at 3 C Discharge (%) | 79 | 77 | 76 | 76 | 67 | 60 | 78 |
| Cycle capacity retention rate (%) | 84 | 81 | 81 | 80 | 73 | 66 | 84 |

|  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Peel adhesion strength (N/m) | 20 | 10 | 20 | 20 | 20 | 10 | 10 | 15 |
| Capacity retention rate at 3 C Discharge (%) | 55 | 54 | 56 | 56 | 55 | 58 | 51 | 53 |
| Cycle capacity retention rate (%) | 59 | 58 | 62 | 62 | 60 | 62 | 56 | 58 |

From results of Table 1, it was found that the positive electrode for batteries prepared using the carbon black for batteries of the present invention has excellent adhesiveness and the battery has excellent output characteristics and cycle characteristics.

On the other hand, it is considered that when the fluorination is performed under an environment where fluorine and oxygen coexist like Comparative Example 6, the excessive fluorination proceeds to result in poor output characteristics and cycle characteristics.

Furthermore, it is considered that since the nitrogen or oxygen cannot convert a C—F group on a surface to a C—OH group or a COOH group as shown in Comparative Example 7 or Comparative Example 8, while the fluorine atom remains, an amount of oxygen atoms was insufficient.

The above results were same also to positive electrodes that use various kinds of active materials, and the positive electrodes for sodium ion secondary batteries, other than the present examples, other than the positive electrodes for lithium ion batteries used in examples.

What is claimed is:

1. A carbon black for batteries, the carbon black having a BET specific surface area measured according to JIS K6217-2 C method of 100 m²/g or larger, and a surface fluorine concentration X (unit: atom %) and a surface oxygen concentration Y (unit: atom %) measured by X-ray Photoelectron Spectroscopy (XPS) satisfying the following conditions (A) and (B), $$0.3 \leq X \leq 4.0 \text{ and} \quad (A)$$

$$0.1 \leq Y \leq 3.0, \quad (B)$$

wherein a DBP absorption amount measured according to JIS K6217-4 is 200 ml/100 g or larger.

2. The carbon black for batteries according to claim 1, wherein a spin-spin relaxation time $T_2$ at 34° C. measured by using an evaluation slurry is 1400 m-seconds or shorter, the carbon black being dispersed in the evaluation slurry in a concentration of 3 mass % in N-methyl pyrrolidone.

3. The carbon black for batteries according to claim 1, wherein a spin-spin relaxation time $T_2$ at 34° C. measured by using an evaluation slurry is 1400 m-seconds or shorter, the carbon black being dispersed in the evaluation slurry in a concentration of 3 mass % in N-methyl pyrrolidone.

4. A manufacturing method of the carbon black for batteries according to claim 1 comprises:
a step of contacting carbon black having the BET specific surface area measured according to the JIS K6217-2 C method of 100 m²/g or larger with a treatment gas containing fluorine of 0.01 vol % or larger and 7 vol % or smaller; and
a step of contacting the carbon black contacted with the treatment gas with gaseous water.

5. The manufacturing method of the carbon black for batteries according to claim 4, wherein an amount of oxygen mixed in the treatment gas is smaller than 0.1 vol %.

6. A coating liquid for batteries comprising:
an active material capable of absorbing and releasing lithium ions;
a polymer binder; and
the carbon black for batteries according to claim 1.

7. The coating liquid for batteries according to claim 6, wherein a DBP absorption amount measured according to JIS K6217-4 is 200 ml/100 g or larger.

8. The coating liquid for batteries according to claim 7, wherein a spin-spin relaxation time $T_2$ at 34° C. measured by using an evaluation slurry is 1400 m-seconds or shorter, the carbon black being dispersed in the evaluation slurry in a concentration of 3 mass % in N-methyl pyrrolidone.

9. The coating liquid for batteries according to claim 6, wherein a spin-spin relaxation time $T_2$ at 34° C. measured by using an evaluation slurry is 1400 m-seconds or shorter, the carbon black being dispersed in the evaluation slurry in a concentration of 3 mass % in N-methyl pyrrolidone.

10. A positive electrode for nonaqueous batteries comprising an active material layer on a metal foil, the active material layer including:
the active material capable of absorbing and releasing lithium ions;
a polymer binder; and
the carbon black for batteries according to claim 1.

11. The positive electrode for nonaqueous batteries according to claim 10, wherein a DBP absorption amount measured according to JIS K6217-4 is 200 ml/100 g or larger.

12. The positive electrode for nonaqueous batteries according to claim 11, wherein a spin-spin relaxation time $T_2$ at 34° C. measured by using an evaluation slurry is 1400 m-seconds or shorter, the carbon black being dispersed in the evaluation slurry in a concentration of 3 mass % in N-methyl pyrrolidone.

13. The positive electrode for nonaqueous batteries according to claim 11, wherein a spin-spin relaxation time $T_2$ at 34° C. measured by using an evaluation slurry is 1400 m-seconds or shorter, the carbon black being dispersed in the evaluation slurry in a concentration of 3 mass % in N-methyl pyrrolidone.

14. A nonaqueous battery comprising:
the positive electrode for nonaqueous batteries according to claim 10.

15. The nonaqueous battery according to claim 14, wherein a DBP absorption amount measured according to JIS K6217-4 is 200 ml/100 g or larger.

16. The nonaqueous battery according to claim 15, wherein a spin-spin relaxation time $T_2$ at 34° C. measured by using an evaluation slurry is 1400 m-seconds or shorter, the carbon black being dispersed in the evaluation slurry in a concentration of 3 mass % in N-methyl pyrrolidone.

17. The nonaqueous battery according to claim 14, wherein a spin-spin relaxation time $T_2$ at 34° C. measured by using an evaluation slurry is 1400 m-seconds or shorter, the carbon black being dispersed in the evaluation slurry in a concentration of 3 mass % in N-methyl pyrrolidone.

\* \* \* \* \*